United States Patent [19]

Gregory et al.

[11] E Patent Number: Re. 33,265

[45] Reissued Date of Patent: Jul. 17, 1990

[54] TAMPER-INDICATING CLOSURE, CONTAINER AND COMBINATION THEREOF

[75] Inventors: James L. Gregory, Toledo; Steven R. Wolfe, Maumee, both of Ohio

[73] Assignee: Owens-Illinois Closure Inc., Toledo, Ohio

[21] Appl. No.: 185,717

[22] Filed: Apr. 25, 1988

Related U.S. Patent Documents

Reissue of:

[64] Patent No.: 4,613,052
Issued: Sep. 23, 1986
Appl. No.: 728,377
Filed: Apr. 29, 1985

[51] Int. Cl.[5] ..... B65D 41/34

[52] U.S. Cl. ..... 215/252; 215/31

[58] Field of Search ..... 215/31, 252

[56] References Cited

U.S. PATENT DOCUMENTS 4,478,343 10/1984 Ostrowsky ..... 215/252
4,546,892 10/1985 Couput ..... 215/252
4,567,993 2/1986 Albrecht ..... 215/252

FOREIGN PATENT DOCUMENTS 234889 9/1977 Spain .
2039817 8/1980 United Kingdom .

*Primary Examiner*—Donald F. Norton

[57] ABSTRACT

A one-piece molded closure of plastic which threads onto a container with a fairly specific exterior configuration and provides a combination such that when the closure is unthreaded, a tamper-indicating ring becomes separated from the lower end of the closure skirt. The indicating ring or band is joined to the closure by frangible bridges and a flexible stop ring is formed within the band and extends inwardly and upwardly when the closure is applied to a container finish. The container finish has a first radial bead and an inwardly tapering side wall surface therebeneath which leads to an abrupt, inwardly extending ledge. The flexible stop ring rests on the tapered surface, when the closure is applied. After closure removal, the stop ring and band drops below the ledge indicating that the closure has been removed.

7 Claims, 3 Drawing Sheets

TAMPER-INDICATING CLOSURE, CONTAINER AND COMBINATION THEREOF

Matter enclosed in heavy brackets [ ] appears in the original patent but forms no part of this reissue specification; matter printed in italics indicates the additions made by reissue.

BACKGROUND OF THE INVENTION

The present invention is directed to a one-piece, molded plastic, or the like, closure that may be threaded onto the finish or neck of a container, and in which a tamper-indicating band is joined to the bottom of the closure skirt by a series of frangible bridges. An inwardly and upwardly turned flexible, stop band is molded inside the indicator band and in combination with a radial bead on the container finish will resist removal of the closure without rupture of the frangible bridges.

Tamper-indicating closures are not new and one recently patented example can be found in U.S. Pat. No. 4,394,918, issued to Jean Grussen on July 26, 1983. In this patent a threaded closure carries a hold ring that is joined to the bottom of the cap skirt by a series of breakable tabs and the hold ring has an inside diameter that is at least equal to the outside diameter of the cap skirt. A plurality of lock lugs supported on the ring are inclined upwardly and inwardly and are intended to hook behind a collar or mating ring on the container neck to prevent the hold ring from being lifted off the container neck when the cap is unscrewed. An unbreakable flange is provided between the cap skirt and the ring and serves as a hinge for the cap when it is unscrewed.

Other tamper-indicating closures that thread on the containers are made fairly simple, but these tamper-indicating rings generally require cooperating, specially designed, means on the container.

Some other tamper-indicating systems have been used in which a frangible band is formed at the bottom of the closure skirt and requires the actual destruction of the band before the closure can be unscrewed. These also may require special ramps and ledges to be formed on the container shoulders or necks. The problem with these systems is that once the band is removed and discarded, it may not be readily apparent that the closure has been unscrewed.

Much of the same can be said for the systems that use heat shrunk or stretch bands that engage the closure and the container. Furthermore, heat shrinking adds an additional step to the sealing process and requires special equipment beyond the normal threaded closure applying machines.

SUMMARY OF THE INVENTION

It is an object of the present invention to provide a screw type cap of plastic with a tamper-indicating ring or band that is carried at the lower end of the skirt of the closure with frangible bridges forming the connection. The removal of the closure results in the indicating band being severed from the closure and the band is moved to a lower position on the neck and is prevented from being returned to its, as applied, position.

It is an additional object of this invention to provide a container whose finish, below the external threads, is formed with an inwardly and downwardly tapering side wall which leads to an abrupt, horizontal ledge such that when an indicating band is severed from a closure, on removal, the band falls below the ledge and cannot be returned. The closure is formed with internal threads in the skirt and at the bottom of the skirt a band or ring of about the same external diameter as the cap is formed with frangible bridges joining the band to the skirt. Within the indicating band an inwardly extending flexible stop ring is formed integral with the indicating band. A particular finish on the container provides a pair of radial ledges which extend outwardly below the threads on the container neck. These ledges are vertically displaced relative to each other and are joined by an inwardly tapering wall which is adapted to form the surface on which the stop ring will be seated when the closure is applied. The stop ring prevents removal of the closure without the separation of the indicating band from the closure skirt.

Other objects and advantages will be apparent from the following description taken in conjunction with the annexed sheets of drawings.

DETAILED DESCRIPTION OF THE PREFERRED EMBODIMENT OF THE INVENTION

Figure 1:
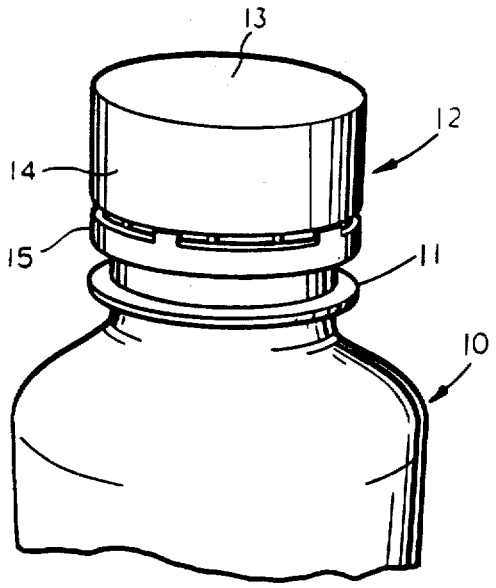
FIG. 1 is a perspective view of the cap and container combination of the invention.
Figure 2:
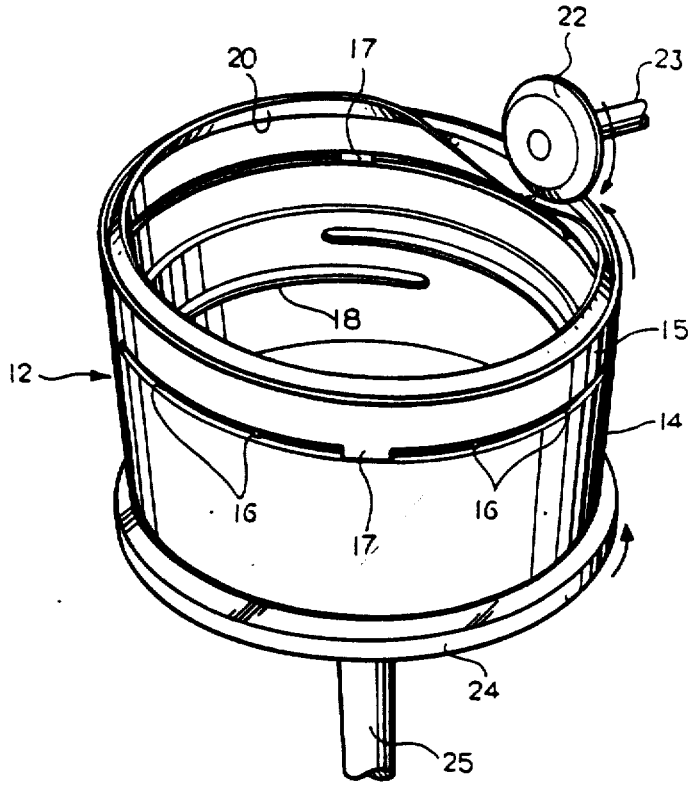
FIG. 2 is a perspective view of the cap of the invention in inverted position illustrating a post forming operation thereon.
Figure 3:
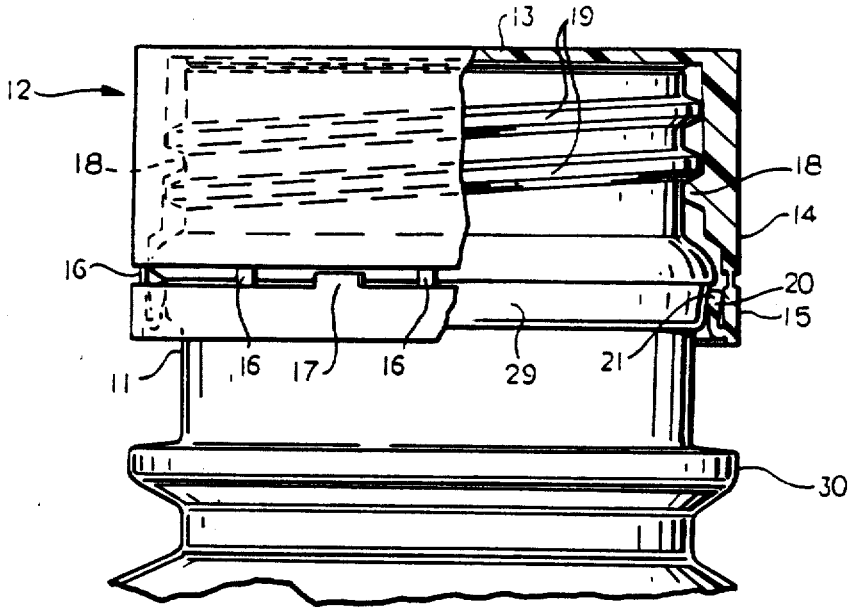
FIG. 3 is an enlarged, side elevational view of the cap and container finish combination of FIG. 1 with the cap in partial section and threaded onto the container finish.
Figure 4:
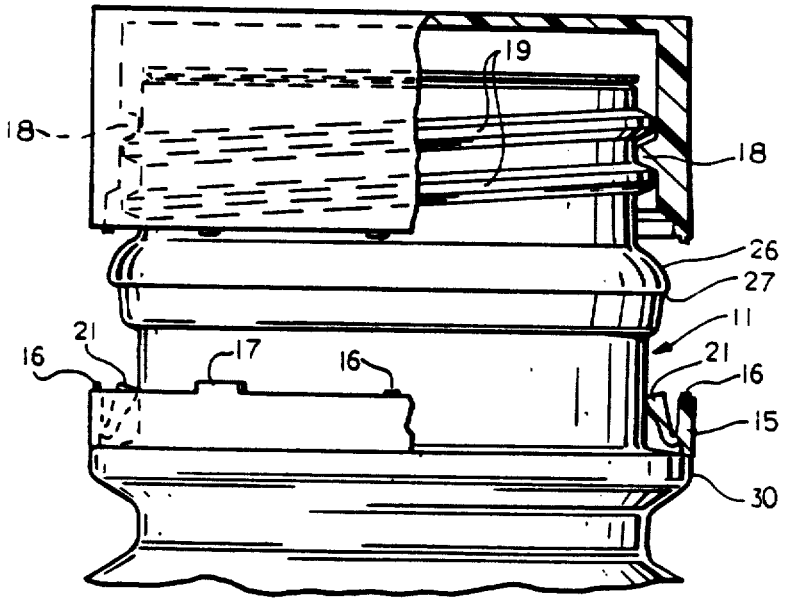
FIG. 4 is a view, similar to that of FIG. 3, after the cap has been partially removed.

With reference to FIG. 1 of the drawings, there is shown a container 10 having a finish or neck 11. Over the finish 11 is shown a closure generally designated 12. The closure 12 is formed of a thermoplastic material molded as a single unit and comprises a generally disc-shaped top 13 with a cylindrical depending skirt portion 14. Below the skirt 14, as shown in FIG. 1, there is provided an indicator band 15. The band 15 is generally cylindrical and has essentially the same external diameter as that of the skirt 14 of the closure 12. The band 15 is joined to the lower end of the cylindrical skirt by a plurality of frangible bridges 16. In the specific embodiment as shown in FIGS. 2–4, there are eight frangible bridges 16. In addition, there are provided four spaced stops 17 which are formed integral with the band 15 and are primarily for use when the closures are molded so as to permit the pushing of the molded closure from the mold die without compressing the frangible bridges 16, yet permit the removal of the closure with attached indicator band 15. The band stops 17 are not attached to the lower skirt of the closure in any way. As best seen in FIGS. 3 and 4, the cylindrical skirt 14 of the closure 12 is provided with internal threads 18. The threads 18 cooperate with externally formed threads 19 on the finish or neck of the container 10.

Within the inner dimension of the indicator band 15 there is an integrally formed annular stop ring 20, and when the cap is initially formed, it will take the configuration shown in FIG. 2. With the stop ring in the inverted form shown in FIG. 2, the stop ring will extend inwardly and upwardly relative to the indicator band with an included angle of approximately 30°. As perhaps can be best seen in FIGS. 3 and 4, the stop ring 20 is integrally formed to the indicator band 15 and *is attached to the interior thereof by a curved hinge portion which extends inwardly and downwardly from the band 15. The hinge portion is constructed and arranged such that the lower end of the stop ring 20 is spaced from the inside surface of the band. The stop ring 20* has a free end 21 of somewhat thicker configurations than the thickness of the connection between the ring and band 15. Immediately after the closure 12 is molded in the shape illustrated in FIG. 2, the closure will be rotated about its central vertical axis, parallel to the cylindrical skirt, and at the same time the stop ring 20 will be engaged by a beveled rotating wheel 22. The wheel 22 is shown as being mounted on a shaft 23, it being understood that the shaft 23 will be driven by any suitable drive means. Furthermore, as shown in FIG. 2, the closure 12 is depicted as being positioned on a rotating pad 24 carried at the upper end of a shaft 25. With the closure being rotated on the pad 24 and the wheel 22 rotating in engagement with the stop ring 20, the stop ring will be forced to bend downwardly and inwardly in the inverted position of the cap, as shown in FIG. 2, with the stop ring being pushed through an angle of approximately 120° from the "as-molded" angle. This rolling-in of the stop ring is done fairly soon (within seconds) after the molding of the closure and the stop ring 20 will then maintain this rolled-in position since the cure time for the plastic will not have been exceeded before the rolling-in is accomplished.

The finish 11 of the container 10, as best seen in FIG. 3, has a radially outwardly curved bead 26 formed therein which extends outward to an extent somewhat greater than the external dimensions of the threads 19. The bead 26 has a lower ledge 27 which may be termed a breaker ledge. As best seen in FIG. 3, when the closure 12 is threaded down over the container finish 11, the stop ring 20 will have its free end 21 positioned beneath the upper bead 26 and either in engagement with or closely spaced beneath the breaker ledge 27. The finish 11 of the container also is formed with a second radial ledge 28 which is below the bead 26 and its breaker ledge 27. The ledge 28 extends inwardly as well, but has its outer, largest diameter surface, connected to the upper ledge 27 by an annular, downwardly and inwardly tapered surface 29. As can be readily be seen when viewing FIG. 3, the free end 21 of the stop ring 20 is beneath the breaker ledge 27 of the bead 26. The moving or unthreading of the closure 12, as illustrated in FIG. 4, results in the breaking of the bridges 16 since the stop ring 20 cannot move above the bead 26. Thus, after the bridges 16 are broken, the indicator band 15, with the stop ring 20, will fall down and rest on a transfer bead or ledge 30 formed at the lower end of the finish 11 of the bottle 10.

Figure 5:
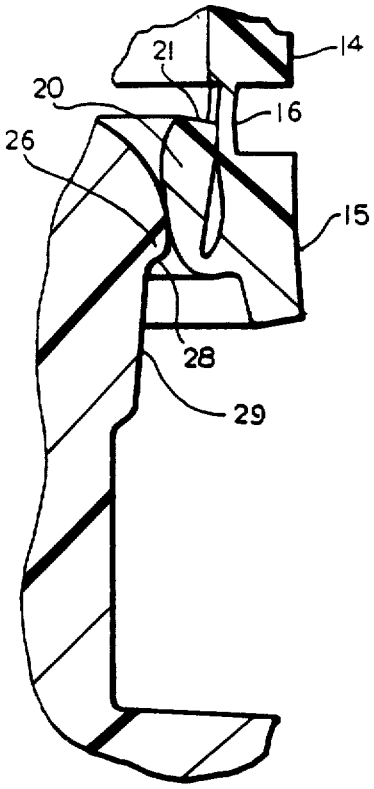
FIG. 5 is a partial cross-sectional view of the lower edge of the cap as it is applied over the container finish.
Figure 6:
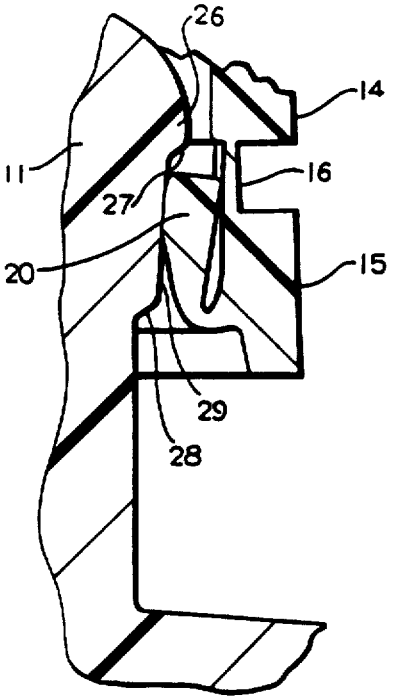
FIG. 6 is a partial, sectional view similar to that of FIG. 5 showing the position of the lower edge of the cap when in its fully applied position on the container finish; and, FIG. 7 is a partial, sectional view of the indicating band and container finish after the cap has been removed.
Figure 7:
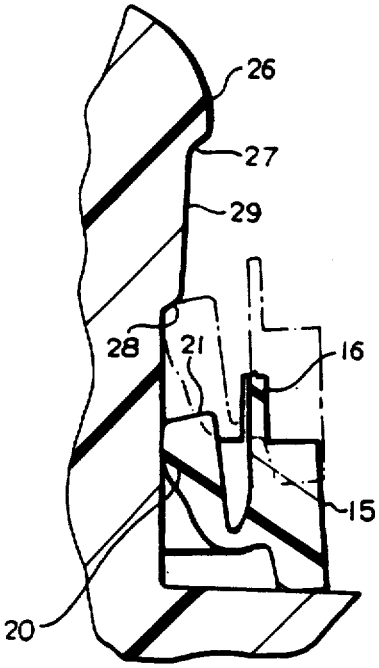

With particular reference now to FIGS. 5–7, the function of the various ledges will be explained. As shown in FIG. 5, the closure with its skirt 14 and indicator band 15 is moving into place on the container finish 11. The closure is made of a flexible plastic such that the stop ring 20 can pass down over the annular bead 26 formed on the external surface of the container finish 11. Once the stop ring has passed the bead 26, it will be positioned generally as shown in FIG. 6, with the upper free end 21 of the stop ring 20 below the breaker ledge 27 of the bead 26. Also, the free end 21 of the stop ring will be in engagement with the tapered surface 29 of the container finish and be held in close proximity to the bridges 16. When the threaded closure is removed from the container finish, the stop ring 20 will be prevented from passing back over the bead 26 by the engagement of the end 21 of the stop ring with the ledge 27 of the bead 26. The bridges 16 are frangible and are of insufficient strength to resist breakage when the closure is threaded off the container finish.

As the threaded closure is being threaded off the container finish, some of the eight bridges 16 will break first and as the continued movement of the closure upwardly occurs, the band 15 and its stop ring 20 is somewhat cammed down by the slope of the tapered surface 29 to a certain extent until such time as all of the bridges are severed, at which time the band 15 and the stop ring 21 will fall to the position illustrated in FIGS. 4 and 7. When the band 15 has been totally severed from the closure skirt 14, it is virtually impossible to ever return the band 15 to its initially applied position as shown in FIG. 6, since the upper free end 21 of the stop ring 20 will engage the ledge 28, as illustrated in the dotted position in FIG. 7. Thus, it can be seen that the closure, once it has been removed from the container finish or neck, and even if reapplied, the band 15 will be separated from the cap and will indicate that the closure has been tampered with or removed. It is impossible to restore the band to its initial position by any normal manual manipulation.

Since the band 15 and the stop ring 20 are flexibly joined, the flexure in the bridge between the two members will permit the end 21 of the band 20 to move inwardly and assume the general position illustrated in FIGS. 4 and 7. Since the lower ledge 28 is significantly higher than the transfer bead of the container, and the indicating band 15 will normally rest on the transfer bead 30 after the closure has been tampered with, a fairly large gap will result and the tampering of the closure will be clearly and positively indicated.

While the particular container illustrated is a plastic container, it should be apparent that the principles of the invention could be equally applied to a glass or even a metal container having the requisite configuration of the axially spaced beads and ledges to permit application of a closure but prevent removal without disturbing the indicator band that is connected to the bottom of the skirt of the closure by frangible bridges.

The foregoing description is by way of the example and is not intended to limit the scope of the invention to any extent greater than that set forth in the appended claims.

*We claim:*

[1. A screw cap for closing the open upper finish of a container comprising, a generally disc-shaped top with an integral, cylindrical, depending skirt, a generally cylindrical flexible, indicating band attached to the annular bottom of said skirt by a plurality of circumferentially spaced, frangible bridging members, a full annular stop ring formed integrally with the indicating band and attached to the interior thereof, said stop ring being positioned inwardly and upwardly with respect to the interior of said indicator band, the upper edge of said stop ring being of sufficient thickness to span any spaced between a container finish to which the closure is applied and the indicating band when in undisturbed, sealing position on the container, and said stop ring adapted to engage beneath an element of the container and prevent the ring from passing the container element after assembly of the closure on a container.]

[2. A screw cap for closing the open upper finish of a container comprising, a generally disc-shaped top with an integral, cylindrical, depending skirt, a generally cylindrical flexible, indicating, band attached to the annular bottom of said skirt by a plurality of circumferentially spaced, frangible bridging members, a stop ring formed integrally with the indicating band and attached to the interior thereof, said stop ring being positioned inwardly and upwardly with respect to the interior of said indicator band, the upper edge of said stop ring being of sufficient height and thickness to span any space between a container finish to which the closure is applied and the bridging members when in undisturbed, sealing position on the container, and said stop ring adapted to engage an element of the container and prevent the ring from passing the container element after assembly of the closure on a container.]

[3. In combination, the screw cap of claim 2 and a container having an open neck; the container element comprising an annular bead on the container finish, and said bead being positioned for being engaged from beneath by the free edge of the stop ring when the cap is placed over the open neck of the container.]

[4. In combination, the screw cap of claim 2 and a container having an open neck finish, wherein said container finish has two radially extending beads with the beads axially displaced with respect to each other and wherein the upper bead is said element on said container and the base of the upper bead is joined to the peak of the lower bead by a downwardly and inwardly tapering surface, and said upper bead being positioned for being engaged from beneath by the free edge of the stop ring when the cap is placed over and closing the open neck of the container.]

5. The combination of claim [4] *12* wherein said stop ring surrounds and is in engagement with said tapering surface, whereby upon movement of the closure relative to the container neck an amount to sever said bridges, said stop ring will be cammed downwardly and fall by gravity to a lower area of the container.

6. The combination of claim 5 wherein said lower bead is of sufficient outer diameter relative to the inner diameter of said stop ring and integral indicator band as to prevent the repositioning of said indicator band to its original assembled position prior to fracture of said bridges.

[7. A container for receiving a threaded closure having a severable indicating band at the lower edge indicating the removal of the closure by the separation of the band from the closure and positioning of the band well below the original position prior to removal, comprising a first radially extending bead having an external diameter that is larger than the internal diameter of a stop ring within said indicator band, said bead having a gradually increasing, outwardly tapering top surface and an abrupt inwardly extending lower ledge, a second bead positioned below said first bead a distance that is substantially equal to the height of said indicating band, said second bead being connected to the base of said ledge on said first bead by a generally tapered surface that increases in diameter with height from the lower ledge and having an inwardly extending abrupt bottom surface, said first ledge adapted to permit the application of the closure with its indicating band thereover but not the removal without severance, and said tapered connecting surface forcing the severed band to fall below the bottom of said second bead and prevent return of the band to its initial assembled position.]

*8. A screw cap for closing the open upper finish of a container comprising a generally disc-shaped top with an integral, cylindrical, depending skirt, a generally cylindrical flexible, indicating band attached to the annular bottom of said skirt by a plurality of circumferentially spaced, frangible bridging members, a full annular stop ring formed integrally with the indicating band and attached to the interior thereof, said stop ring being positioned inwardly and upwardly with respect to the interior of said indicator band, an integral downwardly curved ring portion extending radially inwardly and axially downwardly from the inside portion of said band to said stop ring, the upper edge of said stop ring being thicker than the lower end which is connected to said curved hinge portion, said hinge portion being constructed and arranged such that the lower end of said stop ring is spaced from the inside surface of said band and said upper edge of said stop ring is capable of flexing into contact with the inner surface of said band during application of said closure to said container, and said stop ring adapted to engage beneath an element of the container and prevent the ring from passing the container element after assembly of the closure on a container.*

*9. The combination set forth in claim 8 wherein said hinge portion is thinnest at a point spaced from the inside surface of said band such that said stop ring flexes about a point spaced from said band.*

*10. In combination, the screw cap of claim 8 and a container having an open neck finish, wherein said container finish has two radially extending beads with the beads axially displaced with respect to each other and wherein the upper bead is said element on said container and the base of the upper bead is joined to the peak of the lower bead by a downwardly and inwardly tapering surface, and said upper bead being positioned for being engaged from beneath by the free edge of the stop ring when the cap is placed over and closing the open neck of the container.*

*11. A screw cap for closing the open upper finish of a container comprising a generally disc-shaped top with an integral, cylindrical, depending skirt, a generally cylindrical flexible, indicating band attached to the annular bottom of said skirt by a plurality of circumferentially spaced, frangible bridging members, a full annular stop ring formed integrally with the indicating band and attached to the interior thereof, said stop ring being positioned inwardly and upwardly with respect to the interior of said indicator band, the upper edge of said stop ring being thicker than the lower end, and a container having an open neck finish, wherein said container finish has two extending beads with the beads axially displaced with respect to each other and wherein the base of the upper bead is joined to the peak of the lower bead by a downwardly and inwardly tapering surface, and said upper bead being positioned for being engaged from beneath by the free edge of the stop ring when the cap is placed over and closing the open neck of the container.*

*12. A screw cap for closing the open upper finish of a container comprising a generally disc-shaped top with an integral, cylindrical, depending skirt, a generally cylindrical flexible, indicating band attached to the annular bottom of said skirt by a plurality of circumferentially spaced,*

*frangible bridging members, a stop ring formed integrally with the indicating band and attached to the interior thereof, said stop ring being positioned inwardly and upwardly with respect to the interior of said indicator band, the upper edge of said stop ring being of sufficient height and thickness to span any space between a container finish to which the closure is applied and the bridging members when in undisturbed, sealing position on the container, and said stop ring adapted to engage an element of the container and prevent the ring from passing the container element after assembly of the closure on a container, and a container having an open neck finish, wherein said container finish has two radially extending beads with the beads axially displaced with respect to each other and wherein the upper bead is said element on said container and the base of the upper bead is joined to the peak of the lower bead by a downwardly and inwardly tapering surface, and said upper bead being positioned for being engaged from beneath by the free edge of the stop ring when the cap is placed over and closing the open neck of the container.*

* * * * *

UNITED STATES PATENT AND TRADEMARK OFFICE

CERTIFICATE OF CORRECTION

PATENT NO. : Re. 33,265

DATED : July 17, 1990

INVENTOR(S) : James L. Gregory and Steven R. Wolfe

It is certified that error appears in the above-identified patent and that said Letters Patent is hereby corrected as shown below:

Column 6, line 17, "ring" should be --hinge--

Signed and Sealed this

Twenty-second Day of October, 1996

*Attest:*

*Attesting Officer*

BRUCE LEHMAN

*Commissioner of Patents and Trademarks*